United States Patent [19]

Korcey, Jr.

[11] 3,988,813
[45] Nov. 2, 1976

[54] SLIDE CLASP
[75] Inventor: Joseph J. Korcey, Jr., Portsmouth, R.I.
[73] Assignee: KMC, Inc., Newport, R.I.
[22] Filed: May 19, 1975
[21] Appl. No.: 579,019

[52] U.S. Cl. ................................. 24/238; 24/73 HR
[51] Int. Cl.² ........................................ A44B 13/00
[58] Field of Search ........... 24/73 HH, 73 HR, 238, 24/239; 59/86, 87; 70/459

[56] References Cited
UNITED STATES PATENTS

| 244,515 | 7/1881 | Armstrong | 70/459 |
| 312,105 | 2/1885 | Faivre | 24/73 NH |
| 1,114,289 | 10/1914 | Rittenhouse | 70/459 |
| 1,859,176 | 5/1932 | Servilla | 70/459 |
| 3,212,153 | 10/1969 | Lynch | 24/238 |
| 3,478,550 | 11/1969 | Salvesen | 70/459 |

FOREIGN PATENTS OR APPLICATIONS

| 1,258,893 | 3/1961 | France | 70/459 |
| 961,227 | 4/1957 | Germany | 24/238 |

Primary Examiner—Bernard A. Gelak
Attorney, Agent, or Firm—Salter & Michaelson

[57] ABSTRACT

A slide clasp for coupling the ends of a chain and including a sleeve in which a slide member is received, the slide member having hook portions formed on the ends thereof for receiving the ends of the chain, and being movable relative to the sleeve for exposing a hook portion for the coupling or uncoupling of an end of said chain relative thereto.

5 Claims, 10 Drawing Figures

U.S. Patent    Nov. 2, 1976    3,988,813
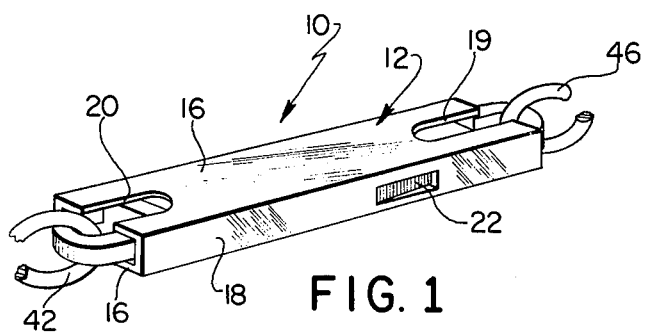
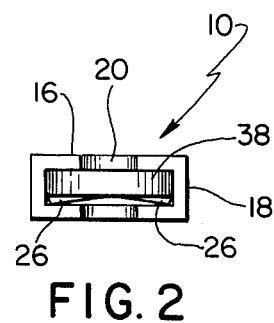
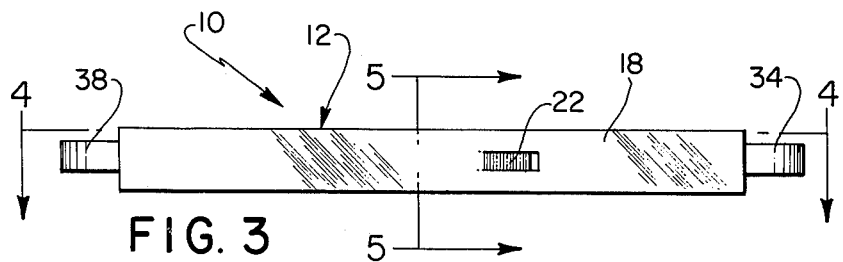
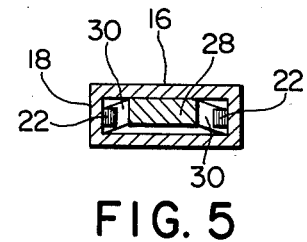
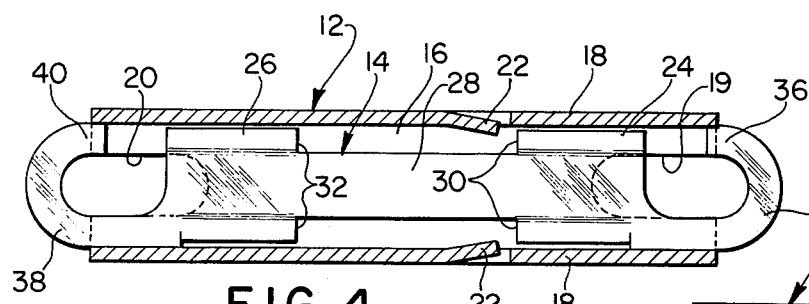
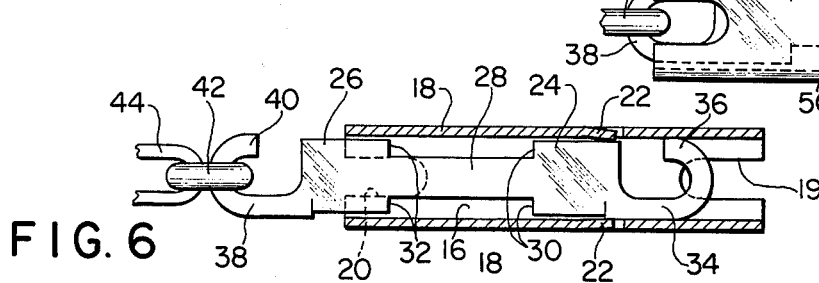
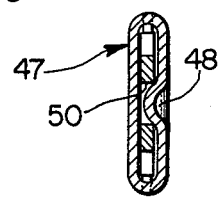
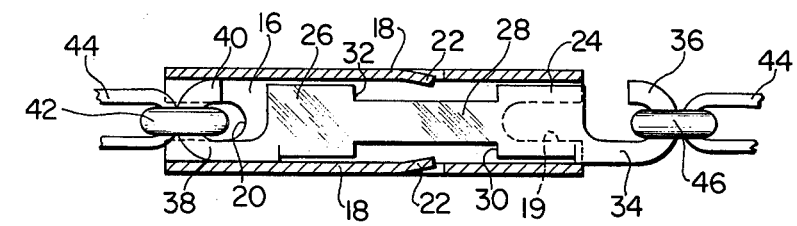
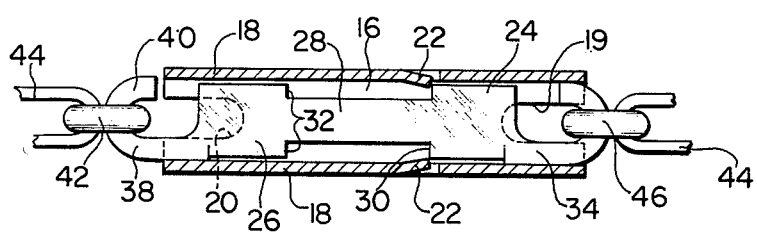

3,988,813

SLIDE CLASP

BACKGROUND OF THE INVENTION

The present invention relates to a clasp to one end of which a flexible chain is permanently attached and that provides for the releasable attachment of the other end of the chain thereto.

Various kinds of coupling devices in the form of clasps have been utilized heretofore for securing the free ends of a flexible chain thereto, one example of such chain being an ornamental chain as used with a jewelry article. Prior to the instant invention, such clasps have taken various forms; and although these prior known clasps performed the purpose for which they were intended, they oftentimes were complicated in structure, which necessarily increased the cost thereof to the consumer. Further, these prior known devices were sometimes difficult to manipulate, and even after a relatively short period of use, would oftentimes break, become jammed, or would otherwise become inoperative and would then have to be discarded.

SUMMARY OF THE INVENTION

The present invention relates to a clasp for coupling the free ends of a chain and has particular application for use with ornamental chain.

The device as embodied in the subject invention includes a hollow sleeve in which a slide member is mounted for sliding movement therein. The slide member is formed with opposed hook portions, one end of the chain being permanently secured to one of the hook portions of the slide member. The slide member is constructed and arranged and cooperates with the sleeve to conceal the hook portion to which the end of the chain is permanently secured. Movement of the slide member relative to the sleeve exposes the other hook portion, to which the other end of the chain is releasably connected. A simple manipulation of the sleeve relative to the slide member conveniently conceals or exposes the other hook portion as required. The slide member is also constructed in such a manner as to be frictionally retained in position within the sleeve, and upon movement thereof relative to the sleeve the other hook portion is exposed for mounting or withdrawing the other end of the chain with respect thereto.

Accordingly, it is an object of the present invention to provide a clasp for coupling the ends of a chain thereto and includes a slide member that is slidably received within a hollow sleeve, the slide member having opposed hook portions, to one end of which the chain is permanently secured and to the other end of which the chain is releasably secured.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention;

FIG. 1 is a perspective view of the clasp as embodied in the present invention and is shown in the closed position thereof as attached to the free ends of a chain;

FIG. 2 is an end elevational view of the coupling device illustrated in FIG. 1;

FIG. 3 is a side elevational view thereof;

FIG. 4 is a sectional view taken along line 4—4 in FIG. 3;

FIG. 5 is a sectional view taken along line 5—5 in FIG. 3;

FIG. 6 is a sectional view similar to FIG. 4 showing the slide member in that position for receiving an end of the chain for permanent securement thereto and prior to movement of the chain within the sleeve for permanently mounting the end of the chain thereon;

FIG. 7 is a view similar to FIG. 6 showing the slide member in that position for receiving the other end of the chain thereon;

FIG. 8 is a sectional view similar to FIGS. 6 and 7 and showing the slide member in the closed position thereof; wherein the free ends of the chain are locked thereto;

FIG. 9 is a top plan view of a modified form of the invention; and

FIG. 10 is a sectional view taken along line 10—10 in FIG. 9.

DESCRIPTION OF THE VARIOUS EMBODIMENTS

Referring now to the drawing and particularly to FIG. 1, the clasp as embodied in the present invention is illustrated and is generally indicated at 10. The clasp 10 is designed for use in the coupling of the free ends of a flexible chain thereto, and in this connection has particular application in the coupling of ornamental chain, such as used in necklaces, pendants or the like.

The clasp 10 includes a housing or sleeve generally indicated at 12 in which a slide member generally indicated at 14 is mounted for slidable movement therein. The housing or sleeve 12 is formed with opposed walls 16 to which are joined side walls 18 in perpendicular relation with respect thereto. The ends of the sleeve 12 are exposed for receiving the slide member 14 therein; and as shown in FIG. 1, the walls 16 of the sleeve 12 have end slots 19 and 20 formed therein. Struck out from the side walls 18 and projecting inwardly therefrom as more clearly illustrated in FIG. 4, are detents 22 which define stop members for preventing return movement of the slide member 14 after an end of a chain has been attached thereto, as will be described.

Referring now to FIG. 4, the slide member 14 is more clearly illustrated and as shown includes enlarged end portions 24 and 26, the dimension of which provides for slidable movement of the slide member 14 within the sleeve 12. Integrally joined to the enlarged portions 24 and 26 is a reduced central portion 28, the junction of the central portion 28 with the enlarged portion 24 defining shoulders 30, and the junction of the central portion 28 with the enlarged portion 26 defining shoulders 32. As will be described, the shoulders 30 are engageable with the detents 22 to prevent movement of the slide member in one direction when the device is in use.

Formed on the end of the enlarged portion 24 and extending outwardly therefrom is a hook portion 34 which terminates in a hook end 36. A similarly formed hook portion 38 having a hook end 40 is joined to the outermost end of the enlarged portion 26. As illustrated in FIGS. 2 and 5, the slide member 14 is bowed in the transverse direction thereof so that the surfaces thereof engage the inner surfaces of the walls 16, wherein frictional resistance against movement of the slide member 14 relative to the sleeve 12 is provided.

Thus, the slide member 14 will tend to be located in the position to which it is moved relative to the sleeve 12.

In use of the clasp 10, the slide member 14 is introduced into the sleeve 12 from the left as seen in FIG. 6, and moved inwardly thereof to that position as shown in FIG. 6, thereby exposing the open hook end 40 of the hook portion 38. An end link 42 of an elongated flexible chain 44 is mounted on the hook portion 38 over the hook end 40 thereof, thereby attaching one end of the chain 44 to the slide member 14. The slide member 14 is thereafter slidably moved toward the right as seen in FIG. 7 until the shoulders 30 clear the detents 22. In this position, the hook portion 38 has been carried inwardly of the sleeve 12 and is substantially concealed therein, the ring 42 being received in the slots 20 and being locked on the hook portion 38. As shown in FIG. 8, movement of the slide member 14 to the left is thereafter restrained by engagement of the shoulders 30 with the detents 22, whereby exposing of the open end of the hook portion 38 is prevented. The ring 42 is thus fixedly mounted on the hook portion 38 in permanent relation.

With the chain 44 permanently mounted at one end thereof to the slide 14 as described, the other end of the chain may then be joined to the hook portion 34, as required, when the chain is to be secured around the neck or wrist of the wearer. In this connection, the slide member 14 is moved to the right as illustrated in FIG. 7, thereby exposing the hook portion 34 and the hook end 36 thereof. Since only the frictional engagement of the slide member relative to the interior surfaces of the walls 16 of the sleeve 12 restrain the slide member in the movement thereof, movement of the slide member is easily accomplished. However, the limit of movement of the slide member in exposing the hook end 36 is defined by entry of the ring 42 into the slot 20. With the slide member 14 now located in the position as illustrated in FIG. 7, an end ring 46 of the chain 44 is mounted on the hook portion 34 by threading it over the hook end 36. The slide member 14 is then moved in the opposite direction or to the left as seen in FIG. 8 until the shoulders 30 engage the detents 22. In this position, the ring 46 is received in the slots 19. Further movement of the slide member 14 is prevented by the detents 22 and in this position the hook end 36 of the hook portion 34 is concealed to lock the ring 46 thereon. The frictional engagement of the bowed slide member 14 within the sleeve 12 prevents accidental or inadvertent withdrawal of the slide member in the direction that will expose the hook end 36 of the hook portion 34. As previously described, the hook portion 38 is effectively concealed within the slide member, or at least the hook end 40 thereof cannot be exposed, and the end ring 42 is permanently attached to the hook portion 38.

As required, the user of the clasp can withdraw the hook portion 34 from within the sleeve 12 when it is desired to either open or close the clasp, and it is seen that the slots 19 as formed in the sleeve 14 not only provide for entry of the ring 46 therein but also enables the hook portion 34 to be more easily grasped when the slide member is to be moved to the right as seen in FIG. 7.

Referring now to FIGS. 9 and 10, a modified form of the clasp is illustrated and is generally indicated at 47. As seen in FIG. 10, the clasp 47 is more compactly constructed than clasp 10 described above, and this is accomplished by eliminating the bowed configuration of the slide member. As shown in FIGS. 9 and 10, the sleeve for the clasp 47 is formed essentially in the same manner as sleeve 12 described above, except that the side walls thereof are rounded to avoid the box corner configuration which reduces the dimensions thereof. The construction of the slide member is essentially the same as slide 14 described above. Formed in a wall of the slide member is an inwardly extending projection 48, while an opening 50 is formed in the central portion 28 of the slide member and is shaped and proportioned for receiving the projection 50 therein. Thus, it is seen that as the slide member in the modified form of the invention is returned to the closed position thereof, registration of the projection 48 with the opening 50 will frictionally lock the slide member in the sleeve and will prevent inadvertent removal of the slide member from the sleeve.

It is understood that the end ring 42 of the chain 44 as attached to the hook portion 38 of the slide member in both forms of the invention will allow movement of the slide member to the right as seen in the drawing, only to the extent of the entry thereof in the slots 20, even though the slide member is movable in the same direction to expose the hook portion 34. Thus, the end ring 42 is able to enter the slot 20 in the sleeve 12 that distance that provides for exposing of the hook end 36 of the hook portion 34. It is also seen that when the slide member is moved to the closed position thereof as shown in FIG. 8, the slot 19 provides for entry of the end ring 46 therein.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A clasp for coupling the ends of a chain, comprising a hollow sleeve having open ends, a slide member mounted for sliding movement in said sleeve and having hook portions formed on the opposite ends thereof, said slide member including end portions between which a central reduced portion is formed, the junction of the central portion with said end portions defining spaced annular shoulders, one end of said chain being secured to one of said hook portions, the hook of which is substantially concealed within said sleeve to permanently lock said one end of said chain to said one hook portion, at least one detent formed on said sleeve and extending inwardly thereof between said annular shoulders for engagement by a shoulder upon longitudinal sliding movement of said slide member in a first direction, wherein further longitudinal movement of said slide member in said first direction is prevented and said one hook portion is prevented from being moved outwardly of said sleeve, the slide member being longitudinally movable in a second direction opposite to that of the first direction to expose the other hook portion, wherein the other end of said chain is releasably mounted thereon, said slide member thereafter being movable in the first direction to conceal said other hook portion in said sleeve while simultaneously concealing the one hook portion therein, and means formed on said slide member and cooperating with said sleeve for frictionally locating said slide member in the locking position thereof.

2. A clasp as claimed in claim 1, said friction locating means on said slide member including surfaces that frictionally engage the inner surfaces of said sleeve for normally limiting movement of said slide member in said second direction.

3. A clasp as claimed in claim 2, said slide member having a bowed configuration in the transverse direction thereof, wherein surfaces of the bowed slide member frictionally engage the inner surfaces of said sleeve.

4. A clasp as claimed in claim 1, said frictional locating means including a recess formed in said slide member and a projection formed on the inner surface of said sleeve and being shaped and proportioned for being received in said recess, wherein said slide member is located in a positive position relative to said sleeve.

5. A clasp as claimed in claim 1, opposed slots formed in sleeve adjacent to said one hook portion as formed on said slide member, said slots being dimensioned for receiving therein a link of said chain that is secured to said one hook portion and defining the inward limit of movement of said slide member in said second direction when the other hook portion is exposed.

* * * * *